April 19, 1927.  1,625,514
A. O. AUSTIN ET AL
APPARATUS FOR FORMING PLASTIC MATERIALS
Filed Feb. 12, 1925   7 Sheets-Sheet 4

Fig. 5

INVENTORS
Arthur O. Austin &
BY Donald Rith Macleod
Nissen & Crane ATTORNEYS

April 19, 1927.  
A. O. AUSTIN ET AL  
1,625,514  
APPARATUS FOR FORMING PLASTIC MATERIALS  
Filed Feb. 12, 1925  
7 Sheets-Sheet 5

INVENTORS  
Arthur O. Austin &  
BY Donald Keith McLeod  
Nissen & Crane, ATTORNEYS April 19, 1927.  
A. O. AUSTIN ET AL  
1,625,514

APPARATUS FOR FORMING PLASTIC MATERIALS

Filed Feb. 12, 1925 7 Sheets-Sheet 7

Patented Apr. 19, 1927.

1,625,514

UNITED STATES PATENT OFFICE.

ARTHUR O. AUSTIN AND DONALD KEITH MACLEOD, OF BARBERTON, OHIO, ASSIGNORS, BY MESNE ASSIGNMENTS, TO THE OHIO BRASS COMPANY, OF MANSFIELD, OHIO, A CORPORATION OF NEW JERSEY.

APPARATUS FOR FORMING PLASTIC MATERIALS.

Application filed February 12, 1925. Serial No. 8,821.

This invention relates to improvements in equipment for forming plastic material and more particularly the forming of ceramic body materials although the improvement is applicable to the forming of many plastic materials. The embodiment of the invention, described herein, is designed especially for the forming of insulators by what is commonly known as the wet process or method. While the method may be used in forming any ceramic articles, it is particularly applicable to the forming of insulators or other parts where it is desired to form a threaded hole in the piece.

The object of the invention is to provide equipment of the class named which shall be of improved construction and efficient and accurate in operation and which shall be provided with means for definitely limiting the thread forming operation so that uniformity and accuracy in the product will be secured.

The invention is exemplified in the combination and arrangement of parts shown in the accompanied drawings and described in the following specification and it is more particularly pointed out in the appended claims.

In the forming of threaded insulator parts it is customary to use parts having threaded recesses commonly known as pinholes, which have approximately four threads per inch. The depth of the pinholes usually runs from one and one-half inches to three inches. These dimensions apply particularly to the fired or finished articles, due allowance being made in the forming process for shrinkage of the material during drying and during the firing or burning process. It is evident, where four threads per inch are used, that for a depth of pinhole of one and one-half inch, there will be required six threads. The number will necessarily be the same in the green or plastic state as in the fired state although the pitch must necessarily be greater in the green or plastic state, when the piece is first formed. For a depth of pinhole of three inches and four threads per inch, twelve threads will be required.

In forming a threaded piece, it has been customary to screw a forming tool equipped with a threaded pin, down into the clay or plastic material by rotating a spindle to which the forming member is attached. One bearing of the spindle is a nut and the spindle has a thread of the same pitch as the thread formed in the green piece. It is seen, where the spindle is rotated, that as it is driven down into the clay or plastic material, it will tend to form a thread. If the rotation is stopped at the end of the stroke and the spindle reversed, the plunger or forming tool will be drawn out, leaving a threaded recess or pinhole in the piece.

It has been customary to use a shift mechanism to control the upward and downward positions of the spindle or forming plunger. This control has been effected by "link mechanism," operating on a clutch or by electrical contact reversing the motor.

These two methods while satisfactory under many conditions, are unsuitable where accuracy is required. It is evident that where a plunger or forming tool is rotated down into the clay or plastic material, the amount of travel being controlled by a clutch, that there is likely to be a considerable variation if there is any change in the resistance of the plastic material. Where the material is soft or the mould is not filled with the same amount of material, there is a tendency for the inertia of the plunger and rotating parts connected with same to travel further before the reversing clutch or motor stops rotation and further downward travel, as the stiffness of the clay, the amount of lubrication or anything that effects the friction between the forming member and the material to be formed. Under these conditions it will be seen that the uniformity of the piece may vary as it is exceedingly difficult to control all of the various factors.

Figure 1:
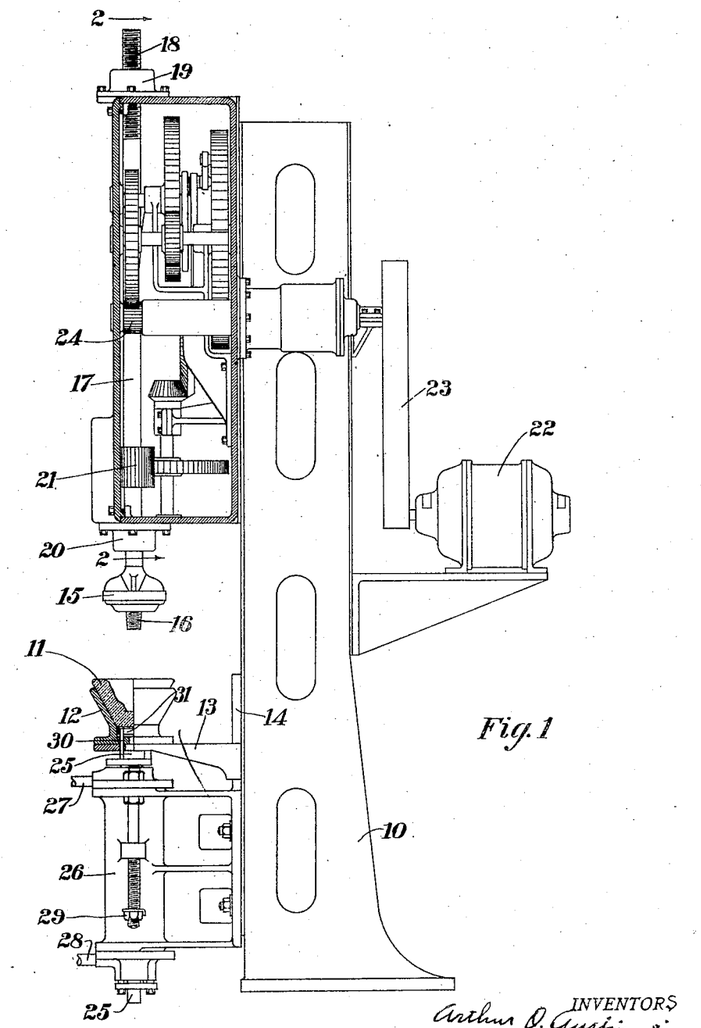
Fig. 1 is an elevation of a machine embodying one form of the invention with parts shown in section.

The present invention corrects these difficulties and provides a mechanism which has many other advantages. One form of this invention is shown in Figure 1. In this figure, 10 is a main body casting or frame to which the various parts of the mechanism are bolted or clamped so that they may be held in proper relation. The mould 11, fits into a pot or a receptacle 12, which is prevented from rotation by an arm 13, which slides up and down on a tongue 14. The forming plunger 15, with a threaded part 16, is attached to a rotating spindle 17. The upper end of the rotating spindle has a threaded portion 18, operating in a fixed nut 19, which forms one bearing. The lower bearing 20, is provided for the other end of the spindle. Spindle 17 has a pinion 21 for rotating same. The spindle is free to rotate in bearing 20, and in the nut 19 and can also, move in a longitudinal direction, within the necessary limits. The driving motor 22 acting through the belt 23 and pinion 24 operates a geared system which alternately rotates the spindle 17 and the attached forming plunger 15, a definite number of turns in the forward and reverse direction alternately. It is the means employed to obtain this definite number of revolutions or more particularly a definite travel and the safeguards connected with same that this invention deals with particularly.

In forming the piece, a piece of clay is placed in the mould 11 and the mould then placed in the pot 12,—when the pot is in the position shown in Fig. 1. The pot 12 is mounted on a piston rod 25 which has a proper head working in a chamber or cylinder 26. This chamber has two ports or openings 27 and 28. By admitting the air or water through the opening 28 and allowing discharge through the opening 27, the piston head with its attached piston rod will be forced upward until the control nut 29 prevents further upward movement.

After pressure has been admitted to the port or opening 28, the mould lifting mechanism will be driven to its upper position which can be controlled by the nut 29 or other suitable means. The mould with the plastic material must be at the upper limit of its position before the forming plunger 15 begins backing out of the plastic material, otherwise the threaded portion formed by the threaded member 16 will be spoiled. By using a lifting pot or mould, the number of revolutions required for the forming may be reduced to that necessary to unscrew the threaded portion 16 so that it will free the plastic material. This usually requires the same number of revolutions as there are threads in the formed piece. Where a pinhole is formed, however, which has considerable taper, the number of revolutions required may be considerably less than the number of threads, as the thread forming part may clear the piece after a few revolutions.

If the pressure on the lower side of the piston head attached to the mould lifting mechanism is not too great, it will serve as a protection to the machine or to the parts used in forming the insulator, for it is evident that if the downward pressure exceeds that produced by the pressure on the lower side of the piston, the mould and its lifting mechanism will be forced downward. This is a considerable advantage where the plunger has a definite downward stroke as any mistake in the setting of the nut 29 which limits the upward travel of the mould or in case the mould is not properly placed in the pot, the mould will be forced downward without causing damage to the machine.

In the forming operation the mould is lifted into its upper position at the same time that the forming plunger 15 is rotating and traveling downward. The mould remains in the upper position until the threaded portion 16 clears the thread formed in the plastic material by the same. The pressure then applied through the port 28 is released and pressure is applied on the upper side of the piston head through the port 27 forcing the lifting mechanism together with the mould downward. The downward travel continues until the point is reached shown in Fig. 1. At this stage some small feet 30 to which a plate 31 is attached strike on the top of the cylinder housing. As the feet 30 are free to move in a vertical direction, they will lift the plate and hold the mould, allowing the pot 12 to recede as it travels further in a downward direction. This loosens the mould so that it may be lifted out of the pot either by hand or by a conveyor or loading or unloading system. When the mould is removed, another one may be put in its place and the operation repeated.

The invention deals particularly with the means of providing a definite travel for the spindle and the forming plunger 15 and, at the same time, produce a relative longitudinal and rotating motion such that threaded parts of a given pitch may be formed. The definite travel of the spindle 17 is accomplished by a gear and link mechanism which will cause the spindle to rotate backward and forward a definite number of revolutions, although the driving motor or mechanism rotates in one direction only. The mechanism has the advantage in that both negative and positive acceleration is controlled without the use of clutches or other mechanism.

Figure 2:
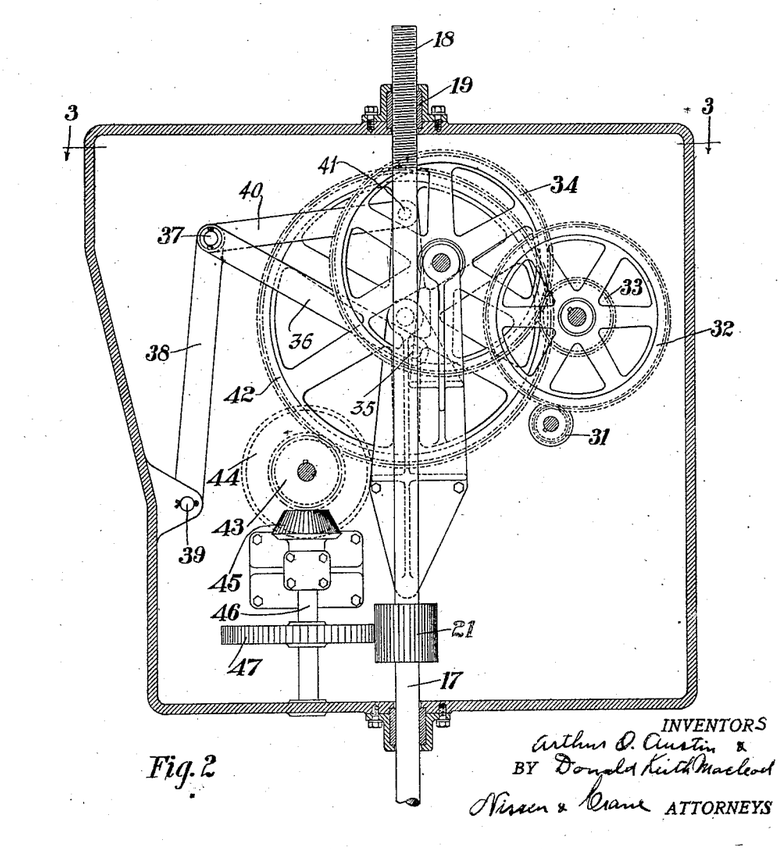
Fig. 2 is a vertical section substantially on line 2—2 of Fig. 1.
Figure 3:
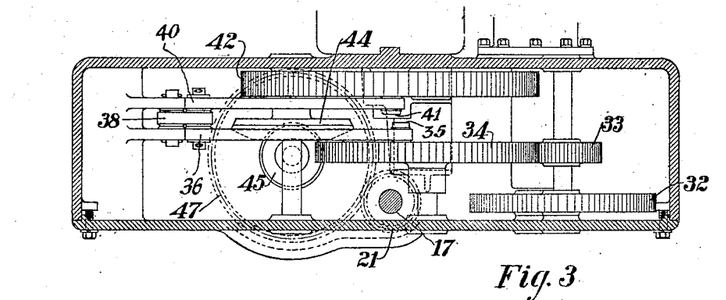
Fig. 3 is a transverse section substantially on line 3—3 of Fig. 1.

In Fig. 2, the motor drives the pinion 31 which meshes with the gear 32. The gear 32 is attached to the pinion 33 which meshes with the gear 34. The gear 34 has a crank pin 35 which operates on a connecting rod 36. The connecting rod 36 is connected by a pin 37 to a link 38 which is hinged on a pin 39. As the crank pin 35 rotates with the gear 34, the arm 36 will be drawn back and forth, the movement of the outer end being determined by the travel of the arm 38 so that the arm 38 and the pin 37 will have a rocking motion, the pin 37 describing an arc with the pin 39 as a center. One end of another arm 40 is attached to the common pin 37, the other end being attached by a pin 41 to the oscillating gear 42. The crank arm of the gear 34 and the pin 41 have such a relation that the large gear will be given an oscillatory motion without producing a dead center and, at the same time, permit of a considerable force for rotating the spindle during forming and reversing operations where energy is required.

In operation, the oscillating gear 42 is driven through the link mechanism so that it operates on a pinion 43. The pinion 43 is attached to a beveled gear 44 which in turn meshes with a beveled pinion 45. The pinion 45 operates through a shaft 46 on gear 47 to rotate the spindle pinion 21 which is fixed to the spindle 17. It will be seen that as the oscillating gear 42 is rotated first in one direction and then in another, the train of gears with which it is meshed will be driven in first one direction and then the other. As the spindle and pinion 21 must be rotated from 6 to 12 times, whereas the oscillating gear 42 only makes a portion of a revolution, it is seen that a proper gear train must be placed between the pinion and the oscillating gear 42 in order to give the proper number of turns to the pinion 21. Unless this is done, the oscillating gear 42 operating directly on the pinion 21 will have to be very large compared to the size of the pinion 21. By using a suitable gear train, however, the motion of the oscillating gear can be magnified and still keep the parts rather small. The spindle pinion 21 is made with a sufficiently wide face so that it can be keyed solidly to the spindle, the wide face permitting it to move in a longitudinal direction without disengaging the gear 47. Owing to the link mechanism, the forming spindle and attached plunger is gradually slowed down and reversed at each end of the stroke.

With the arrangement shown, it is possible to encase the working parts and allow them to work partly or wholly in oil to insure lubrication and reduce wear to a minimum. A machine embodying this mechanism is particularly applicable to the forming of parts where it is not necessary to stop the mechanism. It is possible, however, to obtain the advantage of a definite downward stroke of the forming plunger, although pieces may only be formed at long intervals. This may be accomplished by stopping the motor by any good means when the spindle is at or near its upward position or by providing a clutch at any point in the gear train which drives gear 34 having the crank pin. All that is necessary is for this clutch to disengage at a point so that the mechanism will stop at or near the upper position of the spindle. In practice, it is usually advisable to provide an operating mechanism which will determine the relative time movements between the spindle and the pot lifting the mould.

Figure 4:
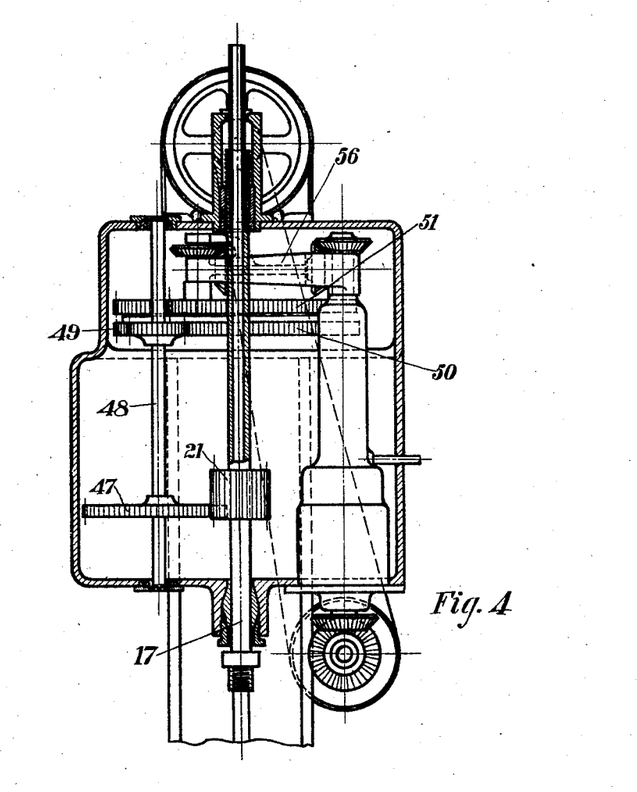
Fig. 4 is a vertical sectional view showing a modified form of reversing mechanism.
Figure 5:
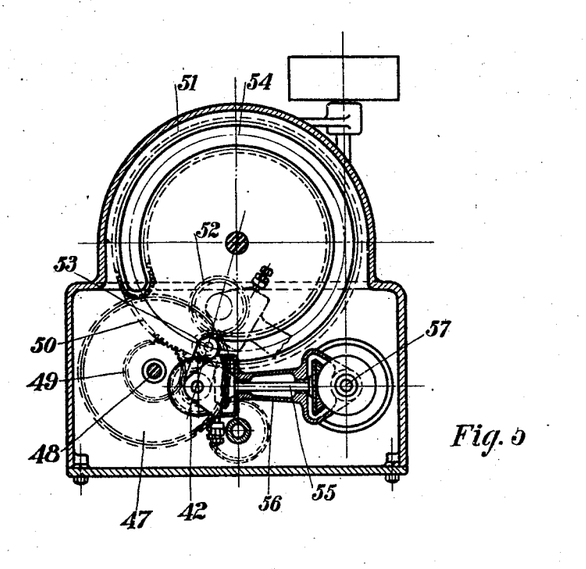
Fig. 5 is a horizontal sectional view of the mechanism shown in Fig. 4.

Another form of mechanism for reversing the rotation of the spindle is shown in Figures 4 and 5. Fig. 4 shows a section taken through the line of the reversing spindle 17. This mechanism embodies a different principle in producing rotation, and, as a large portion of the circumference of the main oscillating gear may be used in this mechanism, a reversing motion may be obtained for wider limits without using exceedingly large parts as in the case where the oscillating gear in Figs. 1 and 2 is used. The pinion 21 is driven by a gear 47 as in Fig. 1. The gear 47 is mounted on and driven through a shaft 48, which in turn is driven by the pinion 49, meshing with a large gear 50. The large gear 50 is mounted on the same shaft or connected to a reversing gear 51. The teeth on gear 51 are located both inside and outside making a continuous path. A gear or pinion 52 meshes with teeth on the reversing gear 51. The driving pinion 52 is held in mesh by a link 59 having a pin 53 operating in a slot 54. As the driving pinion 52 is driven through a beveled gear train mounted on a shaft 55, it will cause the reversing gear 51 to rotate. The driving gear 52 is mounted on a housing 56 which swings about the drive shaft 57 as a center. When the pinion 50 comes to the end of the slot 54, the driving pinion 52 will necessarily have to rotate around the pin 53 as a center. This will throw the driving pin 52 into the position shown in broken lines in Fig. 5. This will reverse the direction of the gear 51 and the gear 51 will move in the other direction until the other end of the slot 54 is reached when the driving pinion will be thrown from the inside to the outside of the gear 51. This will again reverse the direction.

This type of mechanism has certain advantages as a very considerable arc of the gear 51 may be used and the changing in speed or acceleration at the end of the stroke may be controlled to a considerable extent by changing the length of the arm of the rocking driving pinion 52 and by changing the diameter of this pinion.

Figure 6:
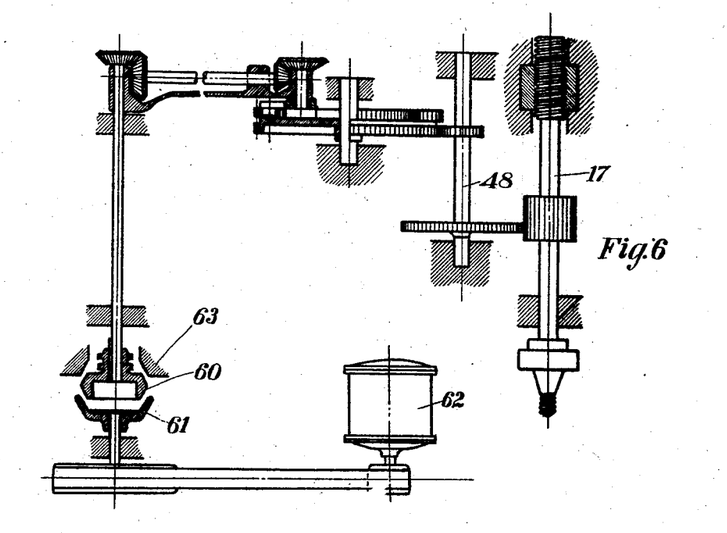
Figs. 6, 7, 8, 9, and 10 are diagrammatic views showing the operation of the mechanism shown in Figs. 4 & 5.
Figure 7:
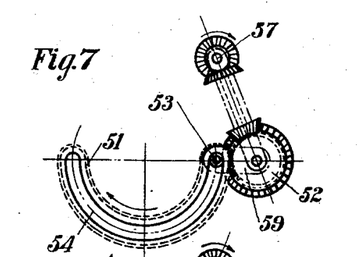
Figure 8:
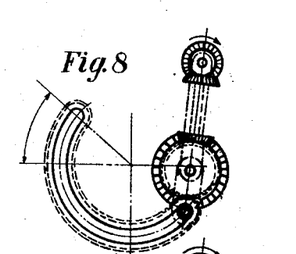
Figure 9:
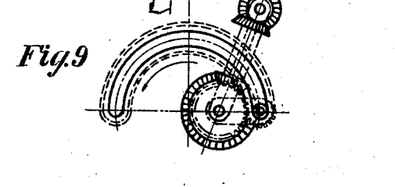
Figure 10:
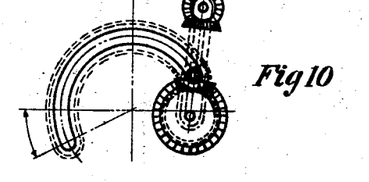

The operation is shown more clearly by reference to Figs. 6, 7, 8, 9 and 10. In Fig. 7 the reversing gear 51 is shown with the driving pinion 52 in mesh on the outside of the gear 51 near the point where the driving pinion starts to travel from the outside to the inside of the rack on the gear 51. As the driving pinion 52 keeps on rotating, it is held in mesh by the link 59 attached to the pin 53 operating inside the slot 54. Since the driving pinion 52 and its gear train rotates about the fixed center 57, the gear 51 will continue to rotate in the same direction until it reaches the relative position shown in Fig. 8. As the pinion 52 continues to rotate, the direction of the rotation of the gear 51 will be reversed until it reaches the position shown in Fig. 9, when the pinion starts to travel from the inside to the outside of the rack. The maximum position is shown in Fig. 10. As the rotation of the pinion is continued, it will be seen by reference to Fig. 10 that the driving pinion will be transferred to the outside of the rack and the rotation will then be in the same direction as in Fig. 1.

The arrangement is shown diagrammatically in Fig. 6 in which a combined clutch and brake 60 is shown for starting and stopping the machine. The part 60 is thrown outward so as to engage the revolving part 61 which is driven by the motor 62. This starts the rotation of the gear train. The forming spindle is driven down to its lower position and when in approximately the uppermost position the clutch 60 is disengaged and thrown so as to engage the braking member 63. This is accomplished by a yoke attached to the part 60 which slides on a key of the shaft upon which it is mounted. With this arrangement it is possible to allow sufficient time for changing the mould, even though the vertical travel of the plunger may be very small. It is evident that if the machine operates continuously, the time of the complete cycle will depend upon the rotating speed of the spindle and upon the number of turns made by the spindle.

With the clutch arrangement, however, it is possible to use a short thread and stop the forming member in the upper position in order to permit sufficient time for change. Since the spindle of the machine has a definite downward movement and may be driven forward at a rate dependent upon the pitch of the thread working in the fixed nut, it is evident that a machine of this kind has valuable properties when used as a tapping machine for tapping blind holes or where there is difficulty in starting a tap.

Figure 11:
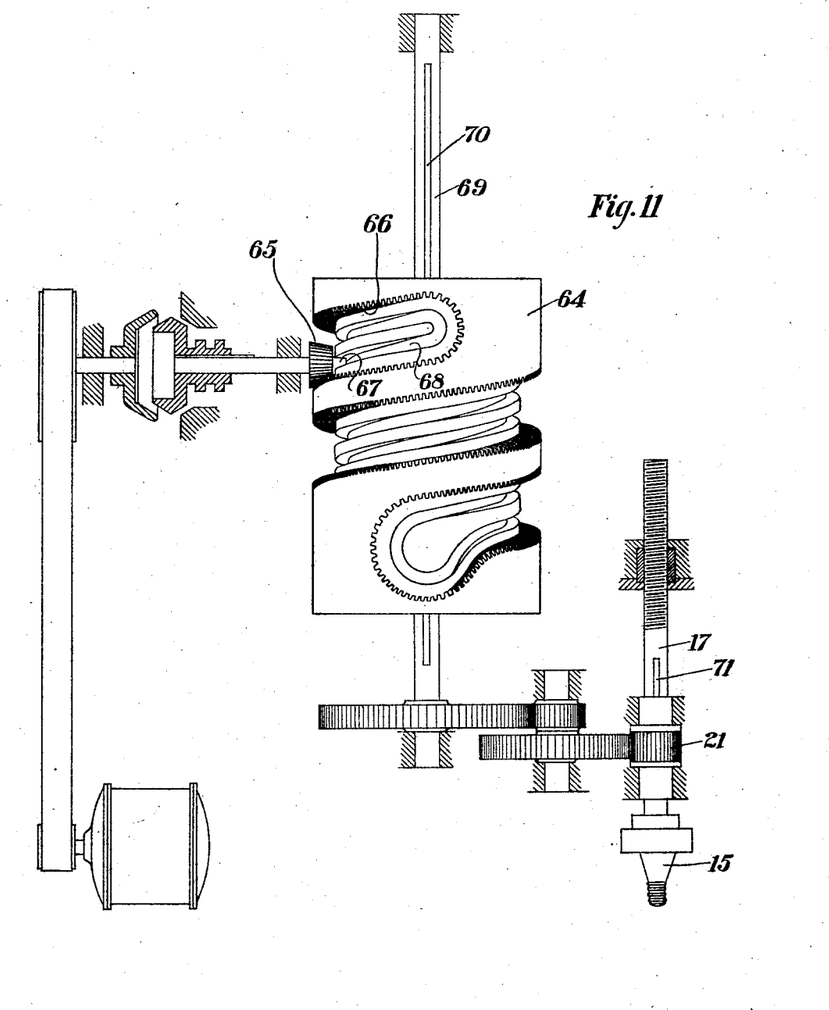
Fig. 11 is a diagrammatic view of a modified form of reverse.

Fig. 11 shows another modification embodying the principles above described. In this case, the reversing rack is built something like a spiral stairway, as shown by 64. In this case, a pinion 65 meshes in the rack 66. The pinion shaft is provided with a point 67 meshing in a groove 68. The member 64 is keyed to a drive shaft 69. The key operates in a slot 70 so that the member 64 is free to move longitudinally on the shaft. As the pinion 65 revolves the projection 67 will insure the rack meshing with the pinion. The projection 67 operating in the groove 68 will move the reversing cylinder or gear 69. It will be seen that the quickness of reverse can be effected by the radius of the groove 68 or the rack 66 at the end of the stroke. At the upper end of the rack, the reverse will be very rapid compared to the lower end of the rack as in the latter case there will be considerable longitudinal movement of the rack without material rotation. This arrangement has the advantage in that a long reversing gear provides long continuous drive in one direction so that the gear train may be reduced to a minimum. This arrangement also has the advantage in that it is practical to give the spindle a good many more turns than in the case where a sector of a circle only is used for the rack. Where the longitudinal movement of the spindle is considerable, it is usually advisable to provide the gear 21 with a rather small face and maintain it in a fixed position relative to the gear train while the spindle 17 slides through a key fixed in the gear 21 and sliding in a keyway 71 furnishes the necessary driving tort through the spindle which is in turn transmitted to the forming plunger 15.

Figure 12:
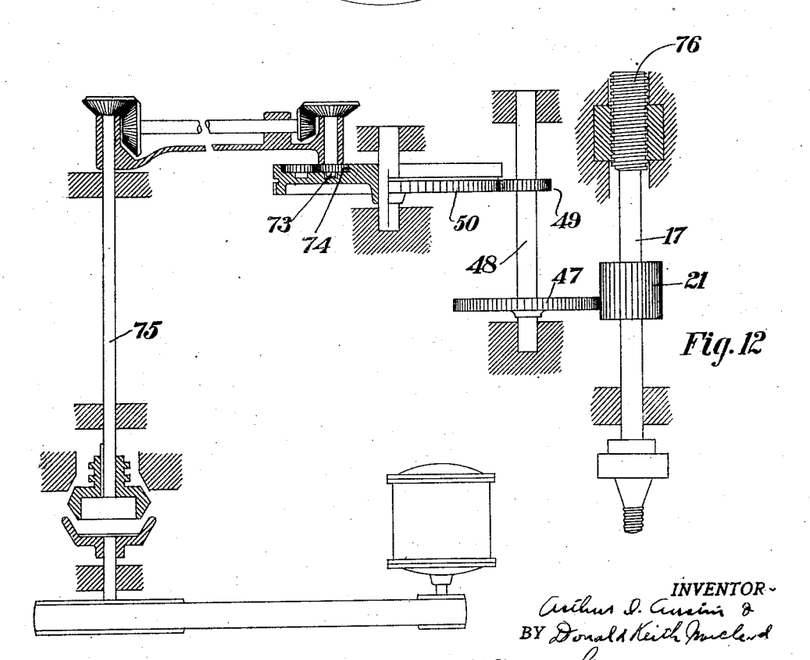
Fig. 12 is a diagrammatic elevation of another form of reverse.
Figure 13:
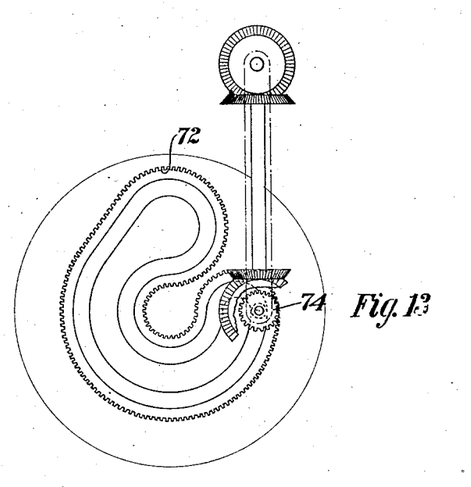
Fig. 13 is a diagrammatic plan of a part of Fig. 12.

A somewhat similar arrangement to Fig. 11 is shown in Figs. 12 and 13. In this case the rack 72 is placed in a horizontal position. The pilot 73 causes the meshing pinion 74 to engage the rack 72 at all times. The driving pinion 74 is mounted in a housing which is free to rotate about the axis of the shaft 75. With this arrangement it is possible to change the acceleration at the end of the stroke by changing the effective radius of the rack 72. It is evident that the radius of the rack is an important factor in determining the rate of rotation. While the pinion is meshing in the outer portion of the rack, the speed will be correspondingly reduced. This makes it possible to effect a quick return or, if desired, to effect a quick forming period and a slight return in order to give sufficient time for making changes for the next cycle. In this case, the thread 76 mounted on the spindle is made in a separate piece so that it can be readily replaced.

We claim—

1. In combination a thread forming member, a continuously connected reciprocating drive having a definite range of movement for advancing said member to form a thread and for arresting the advance of said member at a definite position.

2. In combination a thread forming member and mechanism for advancing and retracting said member, said advancing and retracting mechanism comprising a continuously connected reciprocating drive having a definite range of movement for arresting the advance movement of said member at a definite predetermined position.

3. In combination a thread forming member, mechanism comprising a continuously connected reciprocating drive having a definite range of movement for advancing said member to a predetermined position and for arresting the movement of said member when it reaches said position and for retracting said member, said mechanism operating to rotate said member during the retracting movement thereof.

4. In combination a thread forming member, mechanism comprising a continuously connected reciprocating drive having a definite range of movement for advancing said member to a definite predetermined position and for retracting said member from said position, said mechanism operating to rotate said member in one direction during its advance movement and in a reverse direction during its retracting movement.

5. In combination a thread forming member, mechanism comprising a continuously connected reciprocating drive having a definite range of movement for rotating said member, threaded means for advancing said member when said member is rotated in one direction and for retracting said member when said member is rotating in the opposite direction, said rotating mechanism having a definite limited movement to arrest the rotation of said member in one direction at a definite predetermined angular position and to reverse the direction of rotation thereof when said member has reached said position.

6. In combination a thread forming member, a spindle for said member, a fixed nut having threaded engagement with said spindle and mechanism comprising a continuously connected reciprocating drive having a definite range of movement for rotating said spindle, said rotating mechanism having a definite limit of movement in one direction to provide a definite limit of movement of said threading member as it advances into the work.

7. In combination a thread forming member, a spindle for supporting said member, a nut having threaded engagement with said spindle and a continuously connected reciprocating drive for rotating said spindle, said drive having a definite range of movement to provide a fixed limit of advancement of said spindle when rotated in said nut.

8. In combination a thread forming tool and continuously connected driving mechanism for advancing and retracting said tool, said driving mechanism operating to gradually retard the movement of said tool to bring said tool to rest at a definite predetermined position and thereafter retract said tool by a gradually accelerated retracting movement.

9. In combination a thread forming tool, a spindle for supporting said tool, threaded means for advancing said tool when said spindle is rotating in one direction and for retracting said tool when said spindle is rotated in the opposite direction and continuously connected actuating mechanism for rotating said spindle, said actuating mechanism having a definite range of movement for advancing said tool to a definite predetermined position and operating gradually to retard said tool to bring it to arrest at said position and thereafter gradually to accelerate said tool in a reverse direction during its retracting movement.

10. In a machine for forming plastic material, the combination with a support for the material to be formed, of a plunger for forming a recess in said material, means comprising a continuously connected reversing drive for moving the plunger toward the support and for arresting the movement of the plunger at a definite predetermined position in its path of movement.

11. In a machine for forming plastic material, the combination with a support for a mould, of a plunger for forming a recess in plastic material contained in said mould, means comprising a continuously connected reversing drive for causing said plunger to approach said mould to permit the plunger to make an impression in the plastic material in said mould and for arresting the movement of said plunger when said plunger has reached a definite predetermined position relative to said mould.

12. In a machine for forming plastic material, the combination with a support for a mould, of a plunger for forming a recess in plastic material contained in said mould, means comprising a continuously connected reversing drive for causing said plunger to approach said mould, for rotating said plunger relative to said mould and for arresting said rotation when said plunger and mould have a definite predetermined angular position relative to each other.

13. In a forming machine for plastic material, the combination with a support for a quantity of material, a plunger arranged to approach said support, means comprising a continuously connected reversing drive for relatively rotating said plunger during said approach and for arresting the relative rotation and approach of said plunger at a definite predetermined position of rotation and approach relative to said support.

14. In a machine for forming plastic material, the combination with a pair of complementary forming members of means comprising a continuously connected reversing drive for causing said forming members to approach each other for imparting relative rotation thereto during said approach and for arresting said relative rotation and approach when said members have attained a definite predetermined relative position of rotation and approach.

15. A machine for forming plastic material, comprising a die, threaded mechanism and a continuously connected reversing drive for said threaded mechanism for simultaneously rotating and advancing said die and means for arresting said die at a definite predetermined position of rotation.

16. A machine for forming plastic material, comprising a support for a mould, a plunger having a threaded die thereon, a continuously connected reversing drive for advancing said die toward said support and for imparting rotation thereto during said advancing movement and for arresting said die when it has attached a definite predetermined position of advancement and rotation relative to said support.

17. A machine for forming plastic material comprising a pair of forming members relatively movable toward and away from each other, one of said members having a threaded die thereon for forming threads in said plastic material, mechanism including a continuously connected reversing drive for advancing said members toward each other and for simultaneously imparting relative rotation thereto so that said members approach each other by an amount equal to the pitch of the threads on said die for one complete relative rotation of said members and for arresting the relative movement of said members when said members have reached a definite predetermined position of rotation and advancement relative to each other.

18. The combination with a support for a mould of a threaded die for engaging plastic material in said mould, mechanism including a continuously connected reversing drive for advancing said die into the material in said mould and for simultaneously rotating said die to cause the threads thereon to form threads in the material in said mould, for arresting the movement of said die when it has attained a definite predetermined position relative to said mould and for reversing the rotation of said die and retracting the same to unscrew said die from said mould.

19. In a machine for forming plastic material, the combination with a support for a mould, of a threaded die for engaging plastic material in said mould and actuating mechanism including a continuously connected reversing drive having a definite limited range of movement for advancing said die toward said mould.

20. A machine for forming plastic material, comprising a plunger having a die thereon for engaging said material and actuating mechanism for said plunger, said actuating mechanism including a continuously connected reversing drive operating to impart movement to said plunger to a definite predetermined position and subsequently to retract said plunger from said position.

21. Mechanism for forming plastic material, comprising a plunger having a die thereon and actuating mechanism for said plunger including a motor and a reversing drive forming a continuous connection between said motor and forming mechanism, said actuating mechanism having a definite predetermined range of reciprocating movement.

22. The combination with a support for a mould, of a plunger having a die thereon, threaded means for causing said plunger to approach said support when said plunger is rotated and a continuously connected reversing drive for imparting a predetermined amount of rotary movement to said plunger and for reversing said movement at the limit thereof.

23. A machine for forming plastic material comprising a support for a mould, a plunger comprising a spindle having a threaded die thereon, threaded means for advancing said spindle and die toward said mould when said spindle is rotated and actuating mechanism for said spindle including a continuously connected reversing drive operating to rotate said spindle to bring said spindle to a definite predetermined limiting position both as to angular movement and advancement relative to said support.

24. A machine for forming plastic material comprising a support for a mould, a plunger having a threaded die thereon, threaded means for advancing said plunger toward said support when said plunger is rotated and mechanism for rotating said plunger, said mechanism including a continuously connected reversing drive having a definite range of reciprocating movement to advance said plunger to a definite predetermined position and thereafter reverse the direction of rotation thereof to cause said plunger to be retracted.

25. A machine for forming plastic material comprising a support for a mould, a plunger having a threaded die thereon for engaging the material in said mould, threaded means for advancing said plunger when said plunger is rotated, said means having threads corresponding in pitch to the threads on said die and actuating mechanism including a continuously connected reversing drive for rotating said plunger, said mechanism having a definite range of reciprocating movement to impart the necessary rotation to said plunger to bring said die to the same predetermined position of rotation and advancement relative to said support at each operation of said plunger.

26. A machine for forming plastic material comprising a pair of relatively movable forming members for engaging the material therebetween, means for imparting a limited relatively rapid movement of said members toward each other, means including a continuously connected rotating drive for imparting a further slower movement of said members toward each other and means for relatively rotating said members during said slower movement, said rotating means operating to arrest the relative movement of said members when said members have attained a definite predetermined relative position.

27. A machine for forming plastic material comprising a support for a mould, a plunger having a die thereon for engaging the material in said mould, means for moving said mould to a position adjacent said die and means for advancing said die into engagement with the material in said mould and for simultaneously rotating said die, said advancing means including a continuously connected reversing drive operating to arrest the movement of said die when it has attained a definite predetermined position relative to said mould.

28. A machine for forming plastic material comprising a support for a mould, a plunger having a die thereon for engaging the material in said mould, means for lifting said mould to a definite predetermined position, threaded means for advancing said die toward said mould when said plunger is rotated and mechanism including a continuously connected reversing drive for rotating said plunger, said mechanism having a definite range of reciprocating movement to cause said die to advance to a predetermined position relative to said mould and to be retracted by reverse rotation thereof when it reaches said position.

29. A machine for forming plastic material comprising a support for a mould, fluid pressure means for lifting said support to a definite position, a plunger having a threaded die thereon for engaging the material in said mould, threaded means having a pitch corresponding to the pitch on said die for advancing said plunger into engagement with the material in said mould when said plunger is rotated and mechanism for imparting rotation to said plunger, said mechanism including a continuously connected reversing drive having a definite range of reciprocating movement to cause said plunger to be advanced to a predetermined position relative to said mould when raised and thereafter to be retracted by reverse rotation thereof.

30. In combination a thread forming tool, a spindle for supporting said tool, threaded means for advancing said tool when said spindle is rotated and a continuously connected reciprocating driving member having a definite range of movement for alternately rotating said spindle in opposite directions.

31. In combination a threading tool, a spindle for supporting said tool, threaded means for advancing said tool when said spindle is rotated and mechanism for alternately rotating said spindle in opposite directions, said mechanism comprising a reciprocating member continuously connected with said reciprocating member and a continuously rotating member for imparting a definite range of reciprocation to said member.

32. A machine for forming plastic material comprising a plunger having a thread forming die thereon, threaded means for advancing said plunger when said plunger is rotated and mechanism for imparting rotation to said plunger, said mechanism comprising a continuously rotating member, a second rotating member and means continuously connecting said members and actuated by said continuously rotating member for imparting reciprocating rotary movement through a definite predetermined range to said second rotary member.

33. A machine for forming plastic material comprising a support for a mould, a spindle having a die thereon for engaging the material in said mould, threaded means for advancing said spindle when rotated and mechanism for rotating said spindle, said mechanism comprising a continuously rotating member, a reciprocating rotary member and link mechanism actuated by said continuously rotating member for imparting movement to said reciprocating member through a definite predetermined range so that at each cycle of said reciprocating member said spindle will be advanced to a definite predetermined position and thereafter reversed to cause return movement thereof.

34. A machine for forming plastic material comprising a support for a mould, means for raising said support to a definite predetermined position, a plunger having a thread forming die thereon for engaging the material in said mould, said plunger comprising a spindle, a nut into which said spindle is threaded, the threads on said nut and spindle having the same pitch as the threads on said die and mechanism for imparting a definite predetermined amount of rotation to said spindle to cause said support when said support is raised and thereafter to reverse the rotation of said spindle to retract said die and means for controlling said rotating mechanism to permit arrest of the movement of said die in retracted position.

35. A machine for forming plastic material comprising a support for a mould, a plunger comprising a spindle having a threaded die thereon, threaded means for advancing and retracing said spindle when rotated and mechanism for imparting rotation to said spindle said mechanism comprising a continuously rotating member, a link having one end connected to said member, a floating support for the opposite end of said link, a reciprocating rotary member, a second link connected with said floating support and said reciprocating member to impart reciprocation to said member and clutch mechanism for controlling said continuously rotating member.

In testimony whereof we have signed our names to this specification on this 30th day of January A. D. 1925.

ARTHUR O. AUSTIN.
DONALD KEITH MACLEOD.